United States Patent Office 3,048,638
Patented Aug. 7, 1962

3,048,638
VINYL PHOSPHINES
Donald J. Foster, South Charleston, W. Va., assignor to Union Carbide Corporation, a corporation of New York
No Drawing. Filed Sept. 4, 1958, Ser. No. 758,898
2 Claims. (Cl. 260—606.5)

This invention relates to novel phosphorus compounds. More specifically, this invention relates to novel phosphorous compounds having the general formula:

$$(CH_2=CH)_nPR_{(3-n)}$$

wherein $n$ is an integer from 1 to 3 and R is a hydrocarbon radical such as alkyl, aryl, aralkyl, or a mixture of hydrocarbons. R is preferably a monovalent saturated alkyl radical containing from 1 to about 12 carbon atoms and preferably from 1 to 6 carbon atoms. A few illustrative compounds of this invention include: trivinylphosphine, ethyldivinylphosphine, diethylvinylphosphine, vinyldiphenylphosphine, and propyldivinylphosphine.

The novel compounds of this invention have a wide range of utility. They can be used as: additives to flammable polymers such as poly(acrylonitrile) in order to decrease flammability; polymerization catalysts wherein the novel vinyl compounds act as alfin type catalysts; as additives to gasoline in order to increase octane ratings; as intermediates for the manufacture of vinyl compounds such as vinylsilanes; and as insecticides wherein the novel phosphines are utilized with conventional carriers such as kerosene and sprayed on flying insects.

The novel compounds of this invention are produced by reacting a halo phosphine with a vinyl organometallic compound. The reaction temperatures can vary over a wide range such as from about −50° C. to about +50° C. and preferably from 0° C. to 20° C. The organometallic compound can be represented by the following general formula:

$$CH_2=CHMX_{v-1}$$

wherein M can be any of the organometallic forming elements of the first two groups of the periodic system (page 632 of Hackh's Chemical Dictionary, Third Edition) such as lithium, sodium, potassium, magnesium, zinc and mercury; X is a halogen such as iodine, chlorine, or bromine; and $v$ is the valence of the metal M. A few illustrative examples of the organometallic reactants include: vinylsodium, vinylpotassium, vinylmagnesium chloride, vinylmagnesium iodide, and vinylmercuric chloride. The phosphorous reactant can be represented by the following general formula:

$$X_nPR_{(3-n)}$$

wherein X is a halogen; R is a hydrocarbon radical; and $n$ is an integer from 1 to 3. A few illustrative phosphorous reactants include: phosphorus trichloride, phosphorus tribromide, ethyldichlorophosphine and diethylchlorophosphine. The halides employed in the reactants may be those of chlorine, bromine, or iodine.

The preferred method of practicing this invention is by adding the phosphorus halide reactant, dissolved in an inert solvent, to a solution or suspension of the vinyl organometallic. After the exothermic reaction is complete, the organic material is separated from the inorganic salts and the solvents removed by distillation. The crude trivinylphosphine is preferably stabilized with hydroquinone and distilled to yield a pure product. The reaction of the phosphorous halide reactant with the vinylorganometallic can be represented by the following general equation:

$$CH_2=CHMX_{v-1}+X_nPR_{(3-n)}$$
$$\rightarrow (CH_2=CH)_nPR_{(3-n)}+MX_v$$

wherein M is a metallic element as described hereinabove, X is a halogen, $v$ is the valence of the metal M, $n$ is an integer from one to 3, and R is a monovalent hydrocarbon radical.

The selection of the inert solvent is not critical and may be any inert organic liquid compound such as: tetrahydrofuran, pentane, hexane, benzene, toluene, cyclohexane, ethyl ether and butyl ether.

The following examples are illustrative of the invention.

EXAMPLE 1

A pentane solution containing 1.0 equivalent of phosphorus trichloride was added dropwise to a tetrahydrofuran solution containing 3.0 equivalents of vinylmagnesium chloride. The addition was adjusted to maintain gentle reflux. After the addition was complete, the mixture was allowed to reflux for an additional hour before the trivinylphosphine was separated from the magnesium salts, stabilized with hydroquinone and distilled. The yield of trivinylphosphine was in excess of 90% of theoretical based on the vinyl organometallic; it boiled at 119° C. at atmospheric pressure, showed a strong infrared absorption at 10.2 and 10.9$\mu$, characteristic of the vinyl group, a refractive index $n_D^{20}$ of 1.5084, and contained by analysis 63.6% carbon (theory 64.3) and 8.5% hydrogen (theory 8.1%).

EXAMPLE 2

A butyl ether solution containing 1.0 equivalent of phosphorus trichloride was added dropwise to a butyl ether solution containing 3.0 equivalents vinylsodium. The addition was adjusted to maintain a temperature of ∼20° C. After the addition was complete, the mixture was allowed to reflux for an additional hour before the organic material was separated from the sodium salts. The organic material was stabilized with hydroquinone and distilled. The product boiled at 119° C. at atmospheric pressure, and was identical in all its physical and spectroscopic properties with trivinylphosphine as prepared in Example I.

EXAMPLE 3

Preparation of Ethyldivinylphosphine

A butyl ether solution containing 1.0 equivalent of ethyldichlorophosphine was added dropwise to 2.0 equivalents of vinylsodium suspended in butyl ether. The addition was adjusted to maintain a reaction temperature of ∼20° C. After the addition was complete, the reaction mixture was stirred for an additional hour before the ethyldivinylphosphine was separated from the sodium salts, stabilized with hydroquinone and distilled. It boiled at 121° C. at 751 mm. of mercury pressure; refractive index, $n_D^{20}$, was 1.4857, and the infrared spectra had the characteristic absorption bands for the vinyl groups as well as the bands for the aliphatic ethyl group. Chemical analysis of the $C_6H_{11}P$ showed: C of 62.97% (theory 63.14%), H of 9.6% (theory 9.72%).

EXAMPLE 4

Preparation of Diethylvinylphosphine

A butyl ether solution containing 1.0 equivalents of diethylchlorophosphine was added dropwise to 1.0 equivalents of vinylsodium suspended in butyl ether. The addition was adjusted to maintain a reaction temperature of ∼35° C. After the addition was complete, the reaction mixture was stirred for an additional hour before the diethylvinylphosphine was separated from the sodium salts, stabilized with hydroquinone and distilled. The diethylvinylphosphine boiled at 125° C. at 744 mm. of mercury pressure, and refractive index, $n_D^{20}$, was 1.4764

Elemental analysis of the $C_6H_{13}P$ showed: C of 61.9% (theory 62.05); H of 11.1 (theory 11.28).

What is claimed is:

1. A method for producing trivinylphosphine which comprises reacting one mole of phosphorus trichloride with three moles of vinyl sodium.

2. A process for producing vinylphosphines which comprises reacting a halo phosphine having the general formula $X_nPR_{(3-n)}$ wherein X is a halogen, R is a monovalent hydrocarbon radical and $n$ is an integer from 1 to 3 with a vinyl organometallic compound having the general formula $CH_2{=}CHM$ wherein M is a monovalent organometallic forming element.

References Cited in the file of this patent

UNITED STATES PATENTS

| | | |
|---|---|---|
| 2,916,518 | Burg et al. | Dec. 8, 1959 |
| 2,957,931 | Hamilton et al. | Oct. 25, 1960 |

OTHER REFERENCES

Jones et al.: J. Chem. Soc. (London), 1947, pp. 1446–9.

Kosolapoff: Organophosphorus Compounds, John Wiley & Sons, Inc., New York, 1950, pp. 16 and 17.

Maier et al.: Zeitschrift für Naturforschung, volume 12B, pages 263 and 264 (April 1957).